United States Patent [19]

Nowell

[11] 4,045,887
[45] Sept. 6, 1977

[54] SWITCHING REGULATOR CONTROL CIRCUIT

[75] Inventor: John Rawson Nowell, Phoenix, Ariz.

[73] Assignee: Honeywell Information Systems Inc., Phoenix, Ariz.

[21] Appl. No.: 676,175

[22] Filed: Apr. 12, 1976

[51] Int. Cl.² .............................................. H02H 7/20
[52] U.S. Cl. ...................................... 361/98; 361/100; 361/91; 361/92; 361/86; 361/18
[58] Field of Search .......................... 317/33 SC, 27 R; 321/11, 12, 13, 14, 15, 18, 2; 323/9, 22 SC; 340/415

[56] References Cited

U.S. PATENT DOCUMENTS

| | | | |
|---|---|---|---|
| 3,526,823 | 9/1970 | Genuit | 321/11 X |
| 3,527,987 | 9/1970 | Havlicek | 317/33 SC |
| 3,562,732 | 2/1971 | Genuit | 317/33 SC X |
| 3,573,597 | 4/1971 | Genuit et al. | 321/2 |
| 3,611,108 | 10/1971 | Susumu et al. | 321/11 |
| 3,679,964 | 7/1972 | Nowell | 321/11 X |
| 3,701,937 | 10/1972 | Combs | 321/11 X |
| 3,743,887 | 7/1973 | Keough et al. | 317/33 SC X |

Primary Examiner—J. D. Miller
Assistant Examiner—Patrick R. Salce
Attorney, Agent, or Firm—J. Stanley Edwards; William W. Holloway, Jr.

[57] ABSTRACT

A control circuit for a switching regulator comprised of silicon controlled rectifiers and inductive reactors is disclosed. The control circuit provides for fault detection and voltage regulation while using these output as control signals for a frequency variable gating mechanism to trigger the switching regulator so as to provide its maximum output capability.

13 Claims, 11 Drawing Figures

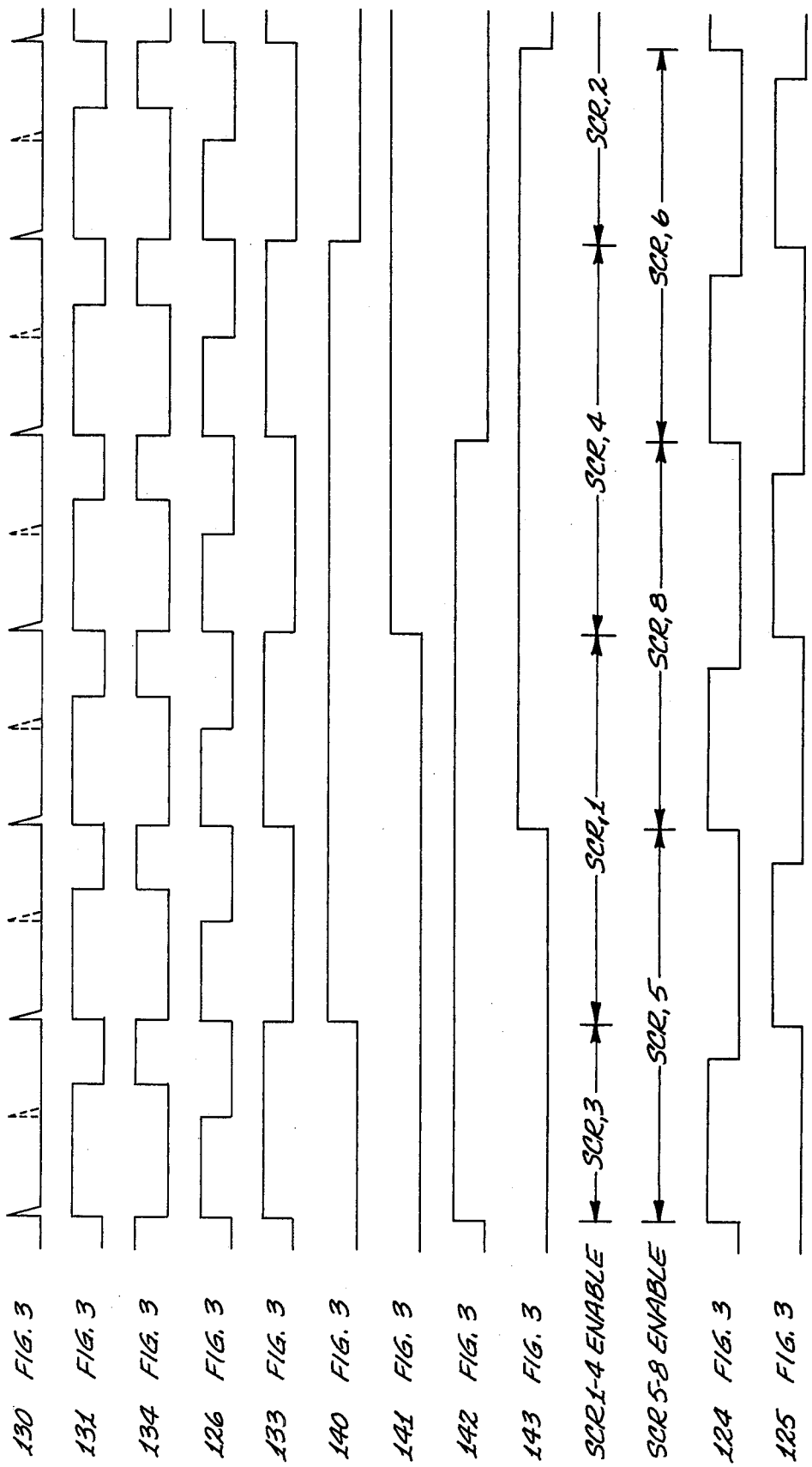

SWITCHING REGULATOR CONTROL CIRCUIT

CROSS REFERENCES

A more detailed description of the operation of the switching regulator can be found in U.S. Pat. No. 3,573,597, by Luther L. Genuit and John R. Nowell, issued Apr. 6, 1971, entitled "High Current Switching Regulator with Overlapping Current Output Pulses."

Other pertinent prior art is shown in:

U.S. Pat. No. 3,764,889 by John R. Nowell issued Oct. 9, 1973;, entitled "Sequencer for a Dual Switching Regulator."

U.S. Pat. No. 3,707,684 by John R. Nowell, issued Dec. 26, 1972, entitled "Error Amplifier for Switching Regulator.438

U.S. Pat. No. 3,728,558 by Luther L. Genuit and John R. Nowell, issued Apr. 17, 1973, entitled "Synchronized Trigger Generators for use with a Switching Regulator."

U.S. Pat. No. 3,697,853 by John R. Nowell and Luther L. Genuit, issued Oct. 10, 1972, entitled "Pulse Generator for use with a Switching Regulator."

U.S. Pat. No. 3,679,964 by John R. Nowell, issued July 25, 1972, entitled "Overcurrent Detector."

BACKGROUND OF THE INVENTION

1. Field of Invention

This invention is a control circuit for a direct current power supply; more particularly, this invention controls an octagonal paired semiconductor controlled rectifier-inductive reactor, switching regulator. The invention described herein operates in combination with a high current switching regulator similar to that disclosed in U.S. Pat. No. 3,573,597.

2. Description of the Prior Art

The prior art devices referenced above and used in combination with the switching regulator disclosed in the above referenced patent were not amendable to adaptation for use with a switching regulator comprised of eight, rather than four, semiconductor controlled rectifier-inductive reactive pairs. In addition, they were bulky in size and extremely complex in design. The semiconductor controlled rectifiers, generally composed of silicon, will be referred to hereinafter as SCR's.

In order to obtain maximum efficiency from a switching regulator it is necessary to operate the SCR's at or near their maximum possible output. One problem operating in this output range is that if the SCR is fired prior to complete discharge from the prior firing, complete destruction of the SCR is possible. To combat this problem while attempting to maintain simplicity and efficiency in the switching regulator, relatively complex control circuitry is required.

The present invention provides all the control signals necessary to operate the switching regulator at its highest possible output level and at the same time provides for current and voltage regulation and fault detection of the regulator output. It is, therefore, an object of this invention to provide a control circuit for an eight paired inductive reactor-SCR switching regulator.

A further object of this invention is to provide control circuitry for a switching regulator that operates the regulator at its maximum capability.

Still another object of this invention is to provide over-voltage and under-voltage detection, correction, and protection in the switching regulator.

A still further object of this invention is to provide for over-current detection in a switching regulator.

One still further object of this invention is to communicate the errors detected through a master controller.

Other objects and advantages of this invention will become apparent from the following description when taken in conjunction with accompanying drawings.

SUMMARY OF THE INVENTION

The foregoing objects are achieved in the present invention by providing a new and improved control circuit for use with an eight paired inductive reactor-SCR, switching regulator. Output voltage and currents are monitored and appropriate control signals are generated when a fault is detected. Essential internal currents are also monitored to insure that the SCR's will not be fired before they have completed their prior cycle and, thereby prevents their destruction. Reliable information is obtained about the status of each SCR by monitoring only two of the eight inductive reactor-SCR pairs. The gating mechanism, through the use of the above mentioned data, can then control the triggering of the SCR's to ensure maximum output from the regulator while at the same time preventing destructive runaway of any of the switching regulator components.

BRIEF DESCRIPTION OF THE DRAWINGS

FIG. 11 is a diagram of the major control signals generated by the timing and inhibit section of control circuitry shown in detail in FIGS. 3 and 4.

DETAILED DESCRIPTION OF THE OPERATION OF THE INVENTION

Figure 1:
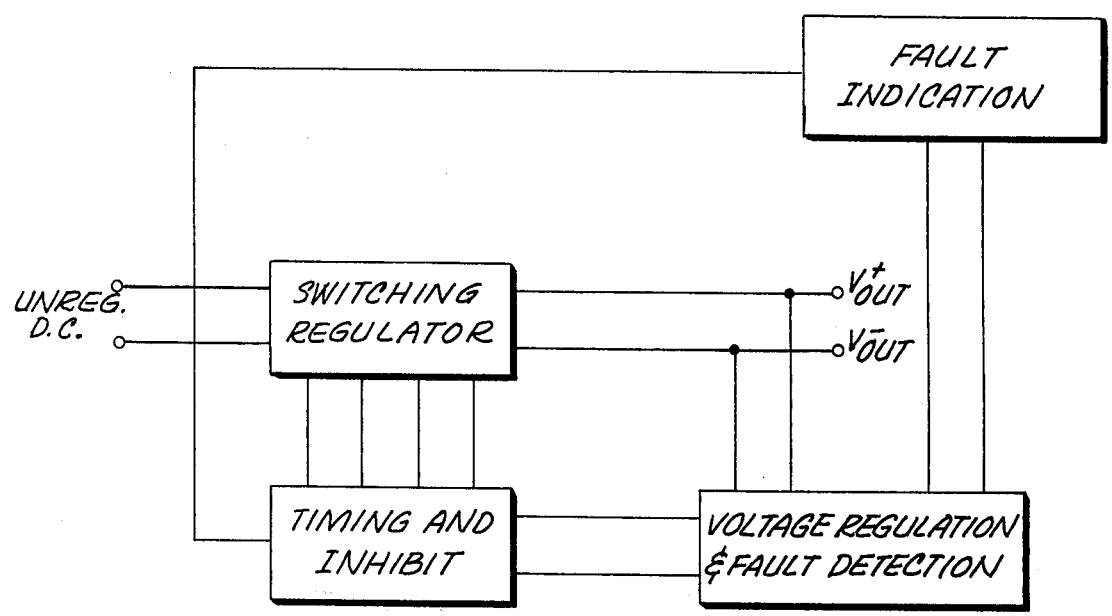
FIG. 1 is a block diagram of the switching regulator and control circuitry.

FIG. 1 indicates in block diagram form the three portions of the instant invention that work in conjunction with the switching regulator to provide a regulated output voltage and at the same time protect the switching regulator from internal destruction that might be caused by failure of one of its own parts. The unregulated DC voltage may be provided by any available source; however, it has been found convenient to operate the instant invention from a 208 volt, three phase power source that is rectified to provide approximately 280 volts DC at the inputs to the switching regulator.

Figure 2:
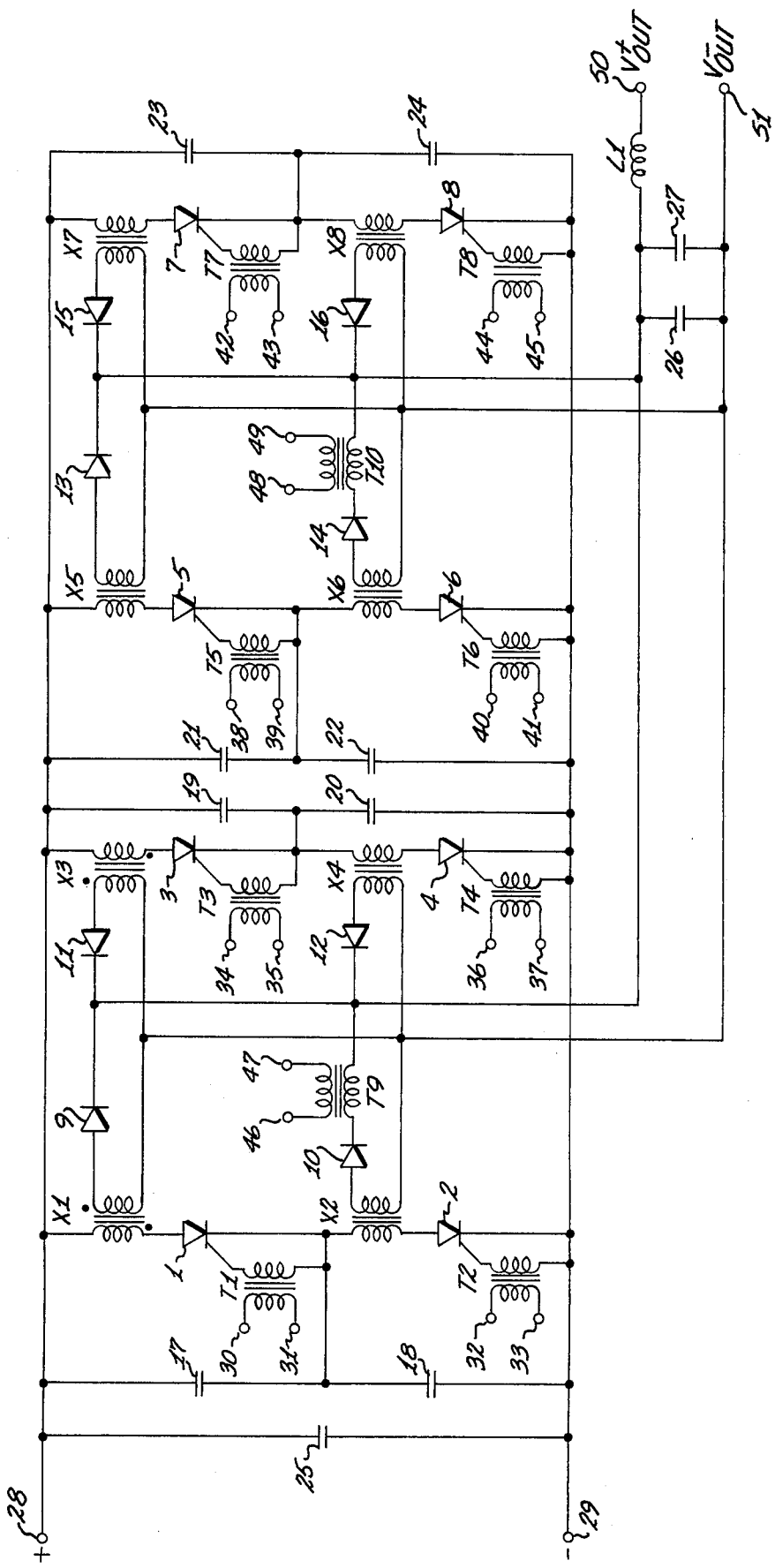
FIG. 2 is a schematic diagram of the eight paired inductive reactor-SCR switching regulator shown in FIG. 1.

FIG. 2 depicts a switching regulator similar to that disclosed in U.S. Pat. No. 3,573,597. It has been modified to operate near its maximum level of efficiency, in terms of power per unit volume readily available components, through the use of eight inductive reactor-SCR pairs constituting the switching regulator rather than the four pair arrangement indicated in U.S. Pat. No. 3,573,597. These pairs are grouped in two sections connected in parallel across the unregulated DC input voltage. While it is possible to implement an operable switching regulator using any number of inductive reactor-SCR pairs, any savings in efficiency by the corresponding drop in output ripple current over the use of the eight inductive reactor-SCR pairs is not justified because of the added bulk made necessary by the extra components versus the incremental decline in output ripple current. The need for greater output capacity does not justify the use of additional inductive reactor-SCR pairs. If greater current capacity is required, the output diodes can be replaced with diodes of greater current capacity or the inductive reactors can be wound with multiple secondary windings thereby distributing the output current through more output diodes and reducing the current through each diode.

The switching regulator of FIG. 2 is treated by the control circuitry as though it was composed of two separate portions. The first portion, containing inductive reactors X1 through X4, transformers T1 through T4, SCR's 1 through 4, diodes 9 through 12, commutating capacitors 17 through 20, and transformer T9. The second portion comprises inductive reactors X5 through X8, transformers T5 through T8, SCR's 5 through 8, output current diodes 13 through 16, commutating capacitors 21 through 24, and transformer T10. Capacitor 25, not directly associated with either of those two portions, is used as a filter capacitor for the unregulated DC input voltage. The outputs of all the output current diodes are connected together and imposed across the filter network comprised of capacitors 26 and 27 and inductor L1 to output terminal 50 and 51.

During normal operation with no faults being generated, the timing and inhibit portions of the control circuitry shown in FIGS. 3 and 4 operate as follows:

The clock pulse generator 100 operates at a nominal 100 kilohertz frequency rate. This frequency, however, is made variable by clock control 128, more of which will be explained in the discussion of FIG. 10. The clock generator can be inhibited by either the clock disable line 129 or by clock disable lines 122 and 123. When a clock pulse is generated at 130, this pulse triggers the monostable multivibrator, hereinafter referred to as a one shot, 118. The positive going output pulse from one shot 118, at 131, is used to trigger one shot 119 as well as disable the clock generator through line 129 via its input to the logic circuit 111. Thus, the pulse at 131 disables the clock generator from producing another pulse from one shot 119 at 126 is inversely proportional to the output voltage of the switching regulator. The workings of one shot 119, shown in detail in FIG. 9, will be described later. Output 126 also acts as an inhibit control to the clock generator through logic circuit 112. However, in normal operation, i.e., after the switching regulator output voltage is at its nominal value, the pulse at 126 is considerably shorter than the output pulse at 131 and, therefore, does not affect the operation of the clock generator. The positive edge of the negative pulse, 134, from one shot 118, is used to trigger flip flop 101. Output 133 of flip flop 101 is, in turn, used to trigger the two-bit gray code counter 102, which could also be a straight binary counter, as well as one shot 113. The outputs of gray code counter 102 are, in turn, decoded to permit one of gates 103 through 106 to sink current source 115. Because the gray code counter 102 is triggered by a negative going edge and one shot 113 by a positive going edge, the two devices are 180 degrees out of phase with each other. For this reason, whenever one shot 113 enables current source 115 via the pulse at 124, gray code counter 102 has been in a stable state for approximately one-half of a clock period. The outputs of current source 115 are tied to one lead on the primary side of transformers T1 through T4 at 31, 33, 35 and 37, respectively. In turn, the other lead of the primary of each of the four transformers is tied either to the output of gate 103, 104, 105, or 106 at 30, 32, 34 or 36 respectively. This enables one current source to feed four primary transformers but only one of the four will be capable of transmitting a trigger signal to one of SCR's 1 through 4. The second half of the control circuit, which controls the firing of SCR's 5 through 8, is similar to that mentioned above except the triggering of grey code counter 117 and one shot 114 is provided by output 132.

Figure 3:
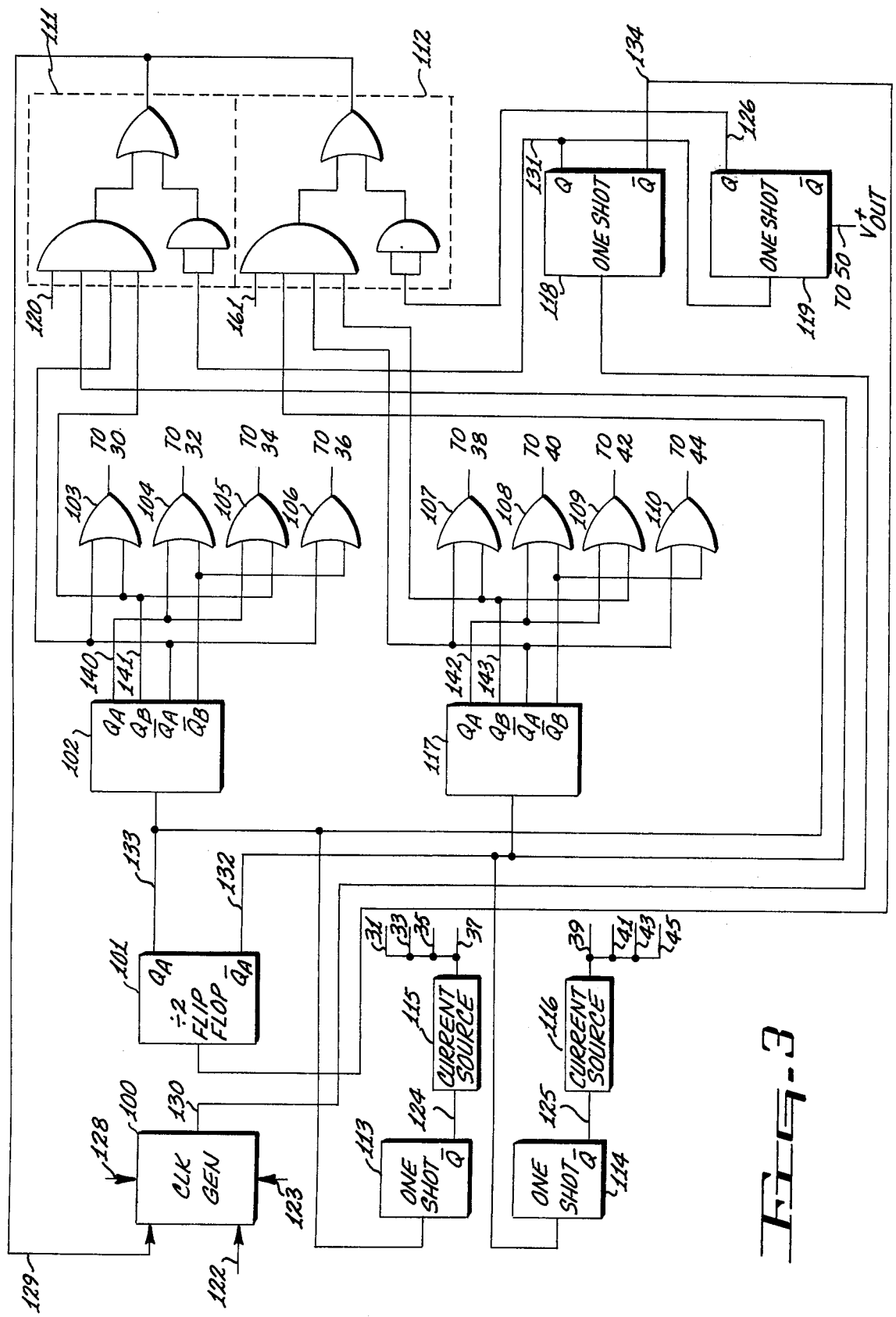
FIGS. 3 and 4 are schematic drawings of the timing and inhibit portions of the control circuitry shown in FIG. 1.
Figure 4:
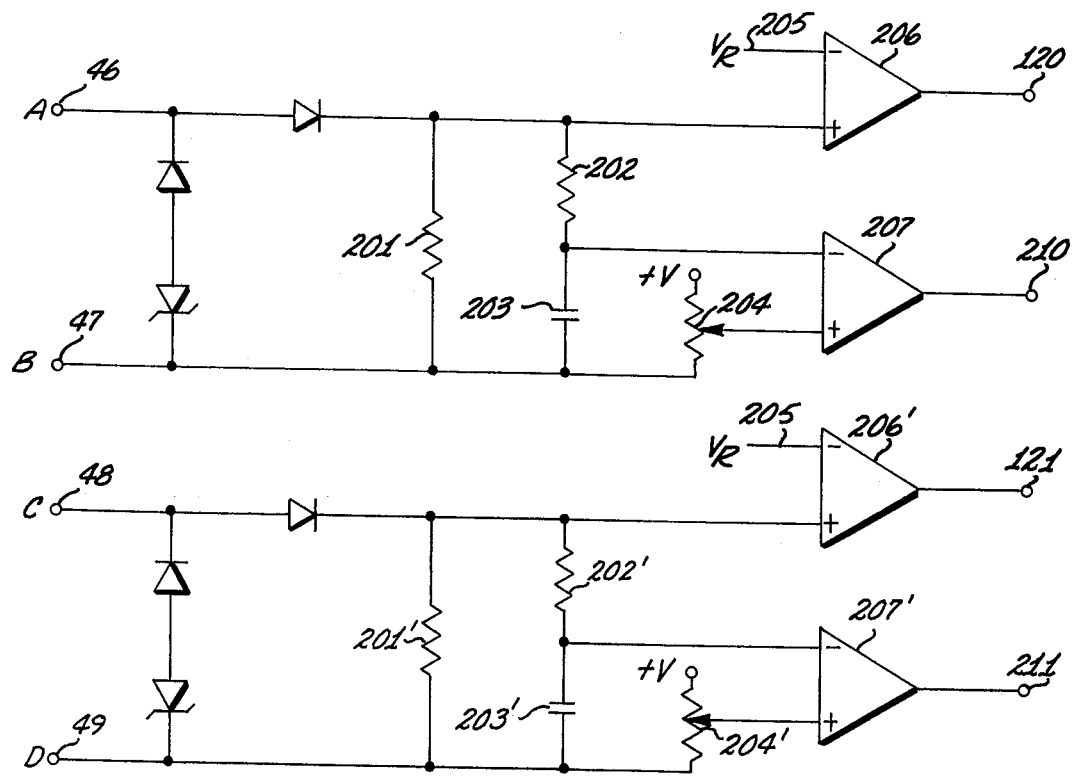

Refer now to FIG. 4. The output current through one output diode in each portion of the switching regulator is monitored. Terminals 46 and 47 correspond to the secondary terminals of transformer T9 of FIG. 2. Output current through diode 10 and the primary of T9 induces a voltage across terminals 46 and 47, more specifically, resistor 201. This voltage is compared by the operational amplifier 206 with a reference voltage 205. Whenever the induced voltage across 201 is greater than the reference voltage 205, the output of 206 at 120 is positive, enabling one input to the AND gate of logic circuit 111 in FIG. 3. The reference voltage at 205 is established to permit the output at 120 to be positive at any time the induced voltage across 201 is greater than 110% of the maximum expected voltage. Output 120 is then used in the above referenced AND gate to disable the clock just prior to the point in time when SCR2 would otherwise be fired. This protective feature, as noted earlier, prevents SCR 2 from being fired before it has completely discharged all of the energy from commutating capacitors 17 and 18, which are connected in parallel AC wise, through inductive reactor X2. At the same time resistor 202 and capacitor 203 monitor the total output current through diode 10. This is made possible by setting the resistor 202 and capacitor 203 time constant such that as long as no abnormal amounts of current is passing through diode 10 and, therefore, limiting the maximum voltage induced across resistor 201, the average charge on capacitor 203 will not exceed the reference voltage at 204 and therefore, will never cause comparator 207's output at 210 to go negative. If in fact too great a current is passing through diode 10, the output at 210 will go negative enabling the OR gate 708 of FIG. 10 to conduct current and cause an over-current indication, more of which will be explained later. The circuit connected to terminals 48 and 49 operate in a like manner in monitoring the output current through diode 14 of the second portion of the switching regulator.

The firing of SCR 2 or SCR 6 is inhibited, as indicated above, by circuits 111 and 112, in a manner which will now be explained. In circuit 111 of FIG. 2 the gray code counter output corresponding to the count at which time SCR 2 would be fired in AND'ed with the inverse clock that fires one shot 113 which in turn enables current source 115 to induce a voltage across the primary of transformer T2 and fire SCR 2. Output 120 of the circuit shown in FIG. 4 is also an input to logic circuit 111.

Having AND'ed outputs 120, the gray code count, and the inverse of the counter clock, the clock generator will be inhibited if all four of those signals are high levels. These four conditions will exist, if at all, only immediately prior to the firing of one shot 113. The clock will remain disabled so long as the voltage across R201 is greater than the reference voltage at 205. A similar sequence of events occurs in logic circuit 112 which is an identical circuit to inhibit the firing of SCR 6 of the second portion of the switching regulator.

Figure 9:
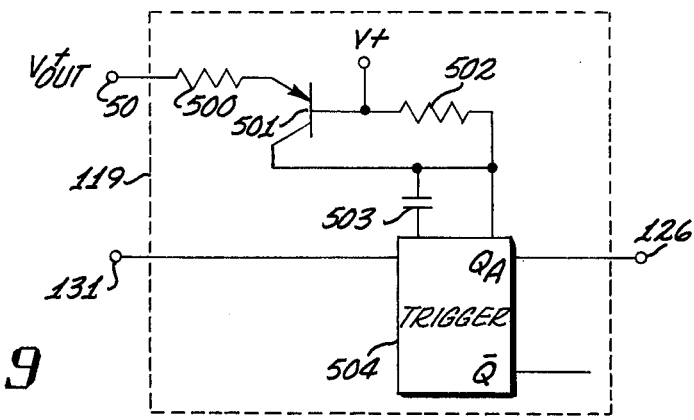
FIG. 9 is a detailed schematic of the one shot 119 shown in block form in FIG. 3.

One shot 119, shown in detail in FIG. 9, protects the switching regulator during initial turn on, by inhibiting the clock generator via logic circuit 112. When the circuit is initially powered, the output voltage at 50 is zero and the pulse length of the one shot is determined by resistor 502 and voltage V+. This resistor voltage combination generates a pulse at 126 that is approximately ten times the duration of a pulse generated by one shot 118 at 131. As the output voltage at 50 increases, transistor 501 becomes conductive and when the voltage at 50 is at its nominal value, only resistor 500 is important for determining the pulse width because its resistance value is considerably less than that of resistor 502. This particular implementation is necessary because during initial turn on, the current pulses through diodes 9 through 16 are of a much greater duration than they are after the output voltage at 50 reaches its nominal value. This condition is caused by capacitors 26 and 27 having been completely discharged through the load. They therefore must be completely charged before the output voltage can be maintained. The initial current pulses are used to charge capacitors 26 and 27. By conducting into a low output voltage the output current pulses through diodes 9 through 16 are greatly lengthened. It is to correct for this situation that the output pulse of one shot 119 is made inversely proportional to the output voltage. In this manner the switching regulator is effectively prevented from running at too high a switching rate during initial turn on and possible destruction of its components parts is prevented.

Figure 5:
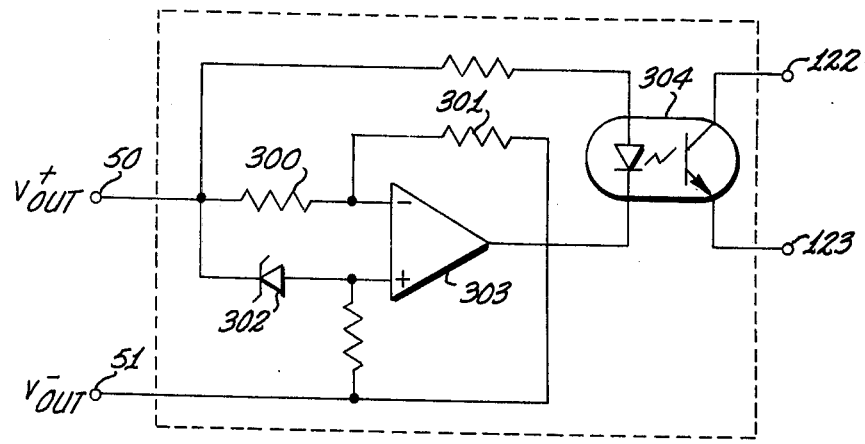
FIG. 5 is a schematic diagram of the over-voltage clock inhibitor indicated in FIG. 3.

A second over-voltage protection circuit is shown in FIG. 5. This circuit protects against over-voltage faults by providing an electrically isolated, optically-coupled signal to the clock generator via outputs 122 and 123 which correspond to the two inputs to the clock generator shown on FIG. 3. In operation the output voltage between 50 and 51 is used as an input to operational amplifier 303 and is processed by the resistive network and zener diode 302. So long as the output voltage across 50 and 51 is within the limits defined by zener diode 302 and the resistors 300 and 301 operational amplifier 303 will not produce enough drive to cause the light emitting diode 304 to turn on its corresponding photo transistor. If, however, the regulator output voltage goes above the predetermined level, operational amplifier 303 will provide a current sink for current flow through the light emitting diode and turn on the photo transistor which then inhibits the clock generator until the output voltage drops to an acceptable level.

Figure 7:
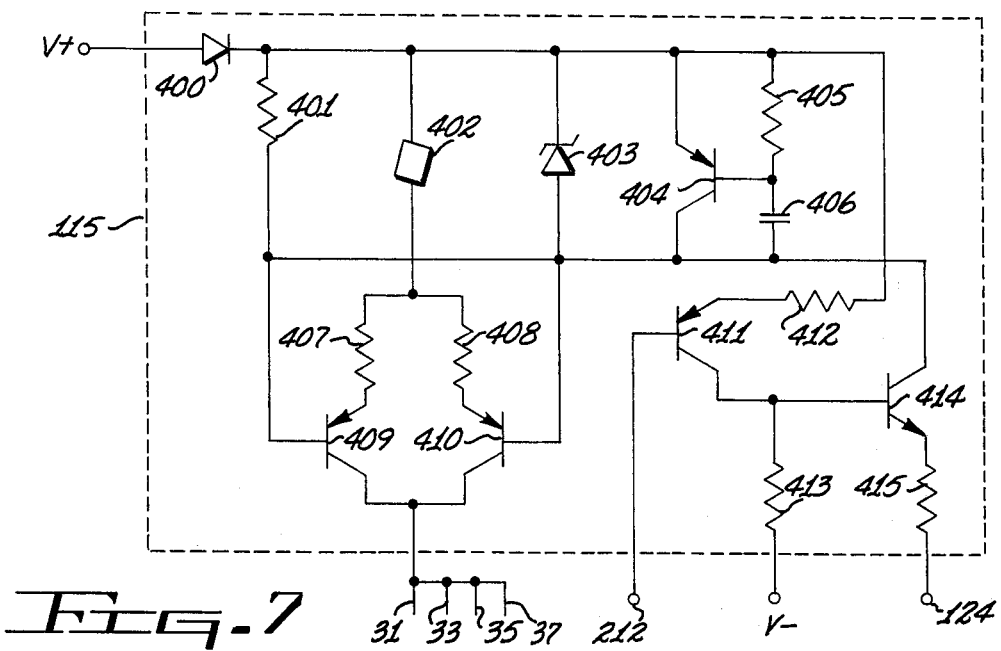
FIGS. 7 and 8 are detailed schematic drawings of the current sources shown in block form in FIG. 3.
Figure 8:
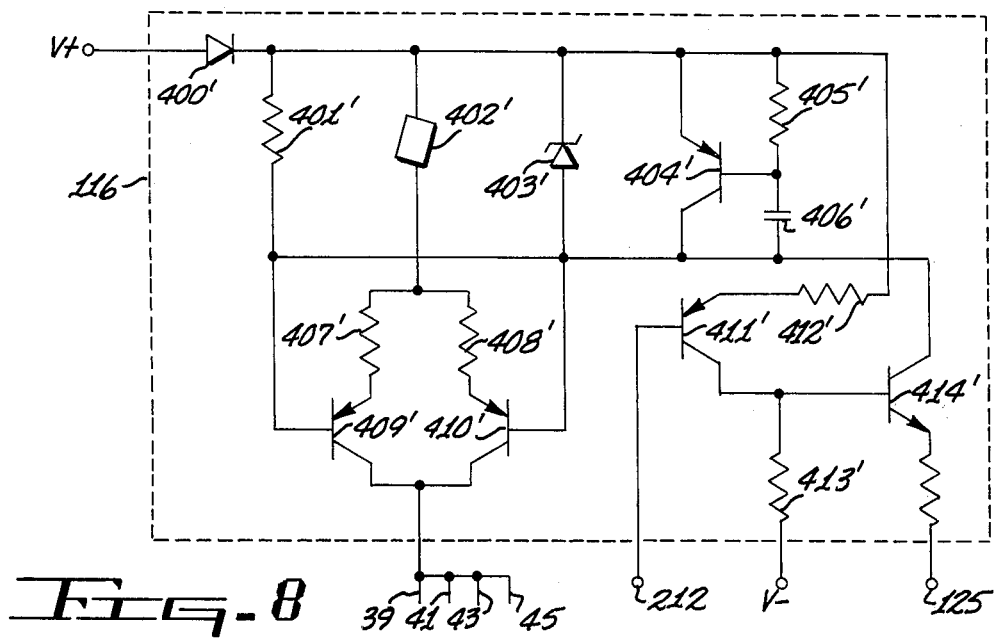

Current sources 115 and 116 of FIG. 3, shown in detail in FIGS. 7 and 8 respectively, provide the current through the primaries of transformers T1 through T8 required to induce a voltage in the secondary of those transformers to turn on SCR's 1 through 8. Prior to the negative going trigger pulse at 124 transistor 414 is reversed biased by the positive voltage at 124. This in turn reverse biases output transistors 409 and 410. Resistor 412 and resistor 411 and resistor 413 tied to negative voltage is used to make sure that 414 is turned off so long as a positive voltage appears at 124. A negative voltage at 124 turns on transistor 414 through transistor 415 and puts a positive potential at the base of transistors 409 and 410 of lesser magnitude than that appearing on the collectors and thereby reverse biases those transistors. The current supply to the primary of transformers T1 through T4 is determined by the parallel combination of resistors 407 and 408. In this instance the circuit is so designed as to deliver approximately 220 milliamps of current. Ferrite bead 402 and transistor, resistor, capacitor, 404, 405, and 406 respectively, are used to prevent oscillations in the circuit. The Zener diode 403 limits the current drawn through resistor 401. In a like manner one shot 114 enables current source 116 shown in FIG. 8.

FIG. 11 is a timing diagram of selected timing and inhibit signals generated by the circuitry shown in FIG. 3. For purposes of illustration it is assumed that no faults are being generated in the switching regulator and that the switching regulator output has reached its nominal value. 130 represents the clock generator output. The dotted pulses represent clock pulses that would have been generated had not signal 131 inhibited the clock. 134 is the clock for flip flop 101 which in turn clocks the gray code counters and one shots 113 and 114. 126 is a control signal that would normally inhibit the clock generator during initial turn on to prevent abnormal operation. Output 133 of flip flop 101 clocks outputs 140 and 141 of gray code counter 102. Outputs 142 and 143 of gray code counter 117 are clocked by output 132 of flip flop 101. Signal SCR 1-4 enable is signals 140 and 141 decoded to indicate which one of SCR's 1 through 4 is enabled. SCR 5-8 enable is signals 142 and 143 decoded to indicate which of SCR's 5 through 8 is enabled. Signals 124 and 125, outputs of one shots 113 and 114 respectively, trigger current sources 115 and 116. Signal 124 will thereby fire the SCR indicated on the SCR 1 through 4 enable line and signal 125 will fire the SCR indicated on SCR 5 through 8 enable line.

As indicated by the timing diagram of FIG. 11, the four SCR's of each half are operated sequentially and interlaced with four SCR's of the other half. In this manner no one SCR will be fired prior to the time that each of the seven other SCR's are fired thereby ensuring that all SCR's will have an equal duty cycle.

Figure 10:
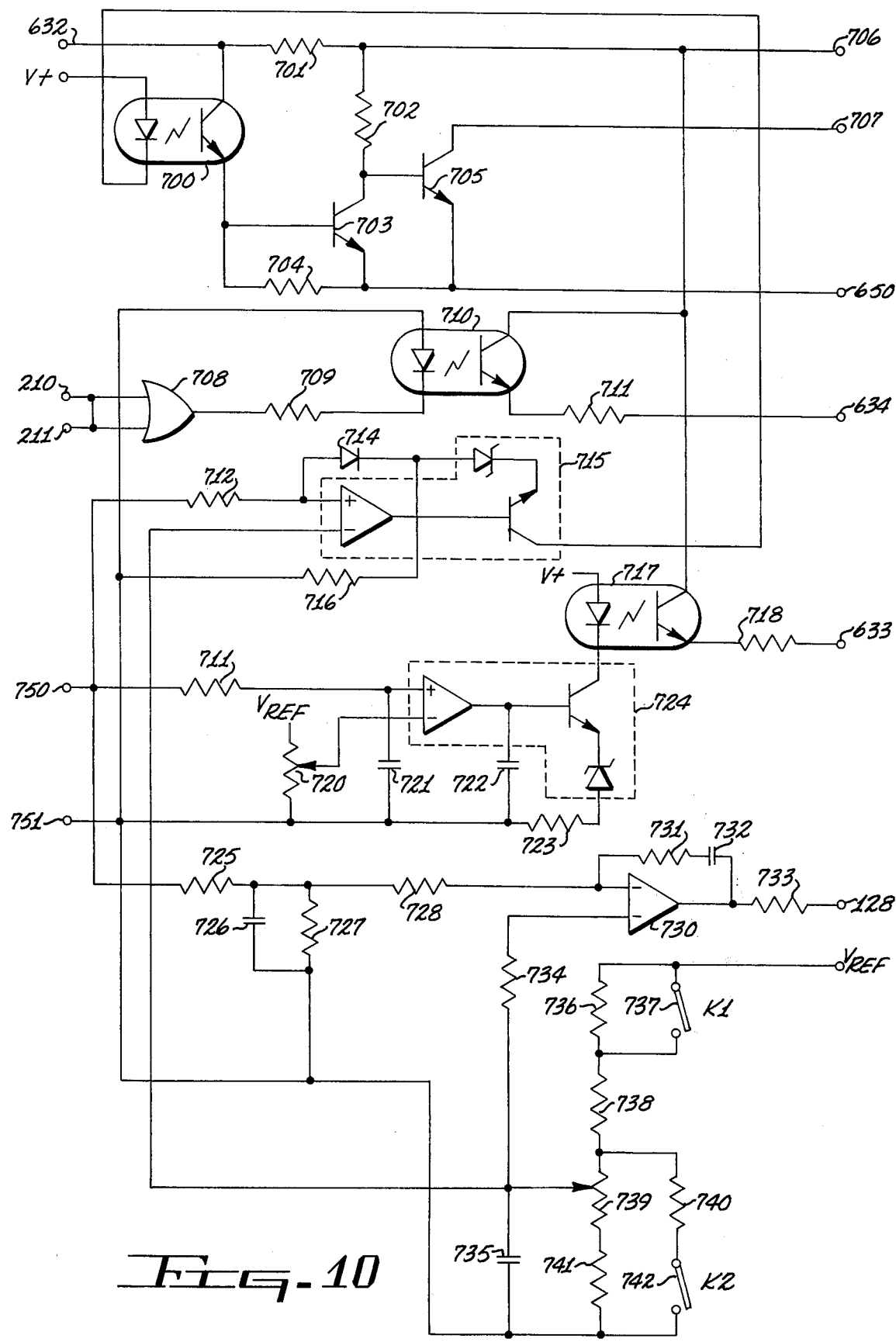
FIG. 10 is a schematic drawing of the voltage regulation and fault detection circuitry shown in FIG. 1.

The voltage regulation and fault detection circuits of FIG. 1 are shown in detail in FIGS. 4, 5, and 10 of the attached drawings. The fault indication portion of this invention is characterized by its simplistic design and its electrical isolation from both the control and the switching circuitry. Effective isolation of the fault detecting circuits is had through the use of light emitting diode-phototransistor packages for optical coupling.

Since in any system there may be line losses from the power supply source to the load, the voltage at the load is compared rather than the voltage at the source, this allows voltage regulation and detection to be able to discount any voltage drop from the source to the load.

An under voltage fault is detected in the following manner. The positive voltage at the load appearing at terminal 750 is applied to the comparator, transistor, zener diode network of integrated circuit 715, in this instance a Fairchild micro amp 723, though various other designs could also be utilized. The positive voltage at the load is compared with a reference voltage generated by voltages drops across R736, R738, potentiometer 739 and resistor 741. If the voltage at 750 should drop below the reference voltage, picked up by the wiper of potentiometer 739, the output of the comparator would go negative turning off the transistor of integrated circuit 715. This in turn would prevent conduction through the light emitting diode photo transistor pair 700. When the transistor of 700 is turned off, the voltage at 632 will equal the high level voltage input at 706. This in turn will cause a fault indication at the fault indication network of FIG. 6, more of which will be explained later. At the same time the under voltage condition is detected transistor 703 will be shut off causing transistor 705 to be turned on through resistor 702 thereby grounding the output at 707. This ground at terminal 707 can be used by a master control network to indicate that the system is no longer operable.

An over voltage fault is detected in much the same manner. The voltage at the load is compared with the voltage on the wiper of potentiometer 720. When the voltage at the load is greater than the reference voltage, the comparator output of integrated circuit 724, identical to integrated circuit 715, will go positive causing the transistor to turn on. This in turn causes the light emitting diode of the light emitting diode phototransistor pair 717 to conduct and turn on the phototransistor. When the transistor of 717 is conducting, it is connected to a logic level voltage from 706 and causes a positive voltage to appear at terminal 633 which in turn is connected to the fault indication circuit of FIG. 6.

An over current fault is detected by wire ORing 211 and 210, discussed earlier, together. They are in turn connected to current sink 708, which, when either 210 or 211 is a negative value, permits current flow through the light emitting diode of the light emitting diode phototransistor pair 710. The conduction of the transistor of 710 causes a high voltage to be presented at output 634 which is in turn connected to the fault indication circuit of FIG. 6.

Voltage regulation of the switching regulator is also provided. The positive voltage of the load, indicated at terminal 750, is processed through a tank circuit comprised of capacitor 726 and resistor 727. This tank circuit removes the AC component of the DC voltage caused by the ripple current. The DC voltage is then impressed across resistor 728 to comparator 730 around which resistor 731 and capacitor 732 form a lag network. This lag network is necessary in order to prevent temporary transients on the source or the load voltage line from causing unecessary changes in the fundamental clock generator frequency. The positive load voltage is compared with a reference voltage generated from resistors 736, 738, potentiometer 739 and resistor 741 similar to that used as the input to the under voltage comparator. One additional and optional feature has also been disclosed, relays K1 and K2, reference numbers 737 and 742 respectively, are activated by logic signals from the master control. In the event that it is desired to check out the system under test under either high voltage or low voltage conditions, appropriate selection of resistors 736 and resistor 740 allows a plus or minus percentage change in voltage, whatever the designer wishes, to be applied. In this instance by pulling in relay 737 a higher voltage can be used as a comparison voltage for the source. To achieve a balanced output the clock control output at 128 will increase the frequency of the clock to generate the desired higher than nominal voltage. In the event that a lower voltage is desired at the load, relay 742 is engaged while relay 737 is not, thereby causing the reference voltage across at the positive input of comparator 730 to drop and, correspondingly, the clock output at 128 will reduce the clock frequency so as to reduce the output voltage of the switching regulator. As long as the voltage changes are within the limits set for the over voltage and under voltage detection circuits, the switching regulator will operate at the new voltage for as long as required.

Figure 6:
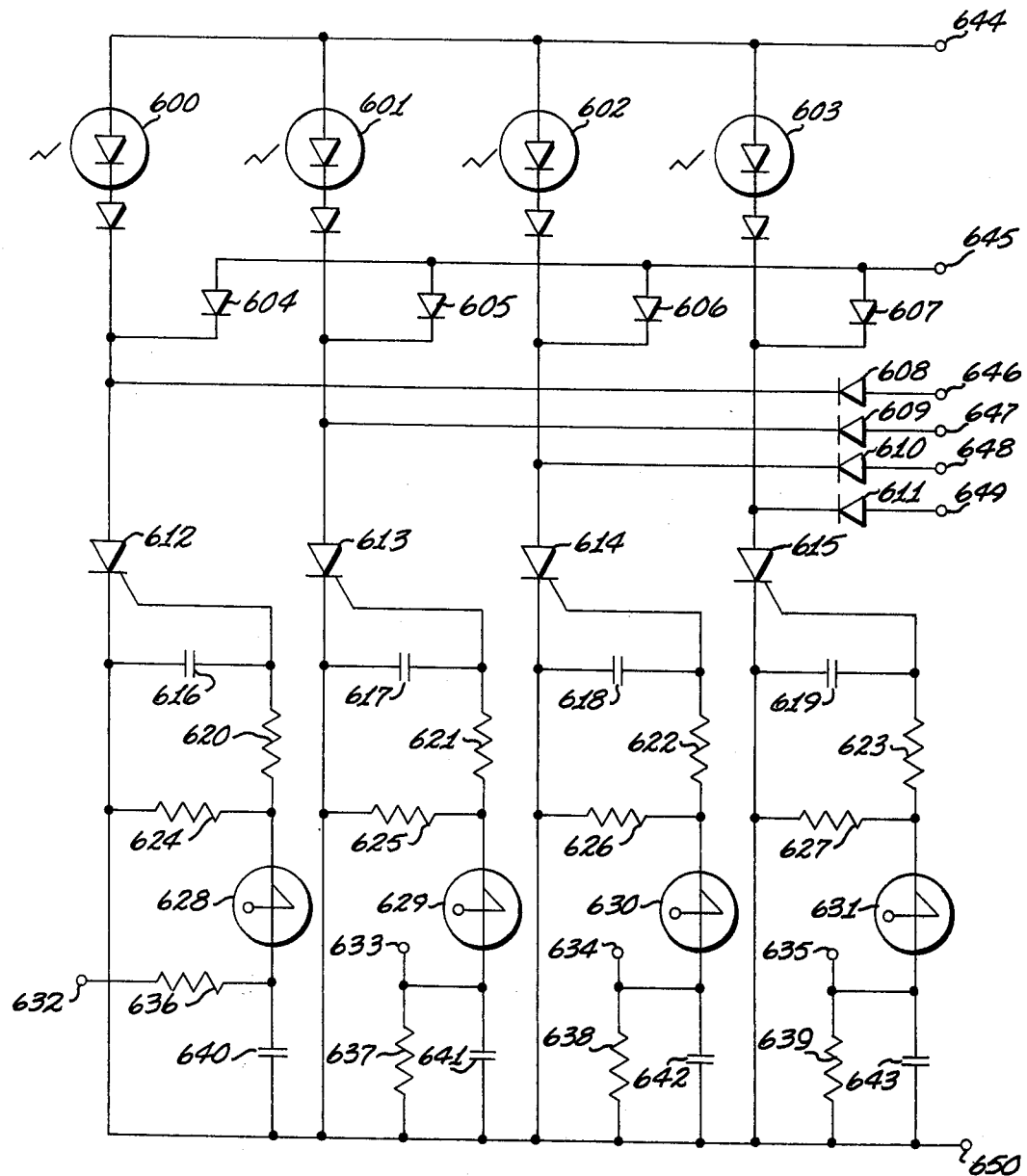
FIG. 6 is a schematic drawing of the fault indication portion of the control circuitry shown in FIG. 1.

The fault indication network of FIG. 6 is substantially four identical circuits in parallel and therefore only the under voltage detection portion will be explained in detail. Attached to terminal 644 is an external power supply for the light emitting diode 600. This diode is generally located such that it is easily visible to someone looking at the switching regulator. In operation the fault detection network previously described causes a high voltage level to appear at terminal 632 when an under voltage condition is detected. Resistor 636 and capacitor 640 form an RC time constant to create a time lag between the time the voltage first appears at 632 and the time that sufficient voltage has accumulated at the junction 636 and 640 to fire the silicon unidirectional switch (SUS) 628. The SUS is a three terminal device which in this application requires the use of only two terminals. In operation it remains non-conductive until the voltage across the device reaches a predetermined value depending on the type of unit purchased. When the prescribed voltage level is reached, the device will then conduct in much the manner of a conventional diode until such time as the voltage across the device drops below the holding voltage (approximately 2 volts). When this occurs, the device turns off and cannot be fired until it is once again made conductive by the high voltage potential across its terminals. When the SUS, 628 does conduct, resistor 620 and 624 cause a potential to be impressed between the gate and cathode of SCR 612 causing it to fire and conduct. Capacitor 616 is used in the circuit to prevent oscillation. When SCR 612 is conductive, current flows through light emitting diode 600 and gives a visual fault indication. At the same time diode 604 is connected to ground through the SCR and the fault line 645 goes from an open condition to a grounded condition indicating to the master control panel a general fault. Diode 608, connected to the anode of SCR 612, is also grounded and gives an individual fault indication to the master control panel of an under voltage fault occurence. In the same manner over voltage detection, over current detection, and blown fuse detection is also generated.

While the principles of the invention have now been made clear in an illustrative embodiment, there will be many modifications of structure, arrangement, proportions, elements, materials and components that are obvious to those skilled in the art without departing from those principles. The appended claims are therefore intended to cover and embrace any such modifications, within the limits of the true spirit and scope of the invention.

WHAT IS CLAIMED IS:

1. A control circuit for a switching regulator utilizing SCR-inductive reactor switching comprising:
   a. timing means connected to the switching regulator for triggering each SCR sequentially at the switching regulators optimal switching rate;
   b. first fault detection means connected to the switching regulator for individually detecting over-voltage, under-voltage and over current faults, and providing inhibit signals to the timing means;

c. second fault detection means for providing fault signals to a master control panel for shutting down the switching regulator;

d. fault indication means connected to the fault detection means for individually indicating the type of fault detected; and e. voltage regulation means connected to the switching regulator output and the timing means for maintaining a desired voltage at the switching regulator output.

2. The control circuit of claim 1 wherein the timing means further comprises:

a. a clock pulse generator;

b. clock pulse generator inhibiting means connected to the clock pulse generator for protection of the switching regulator and limiting the maximum switching rate of the regulator;

c. counter means connected to the clock pulse generator for selecting the SCR to be triggering; and d. SCR firing means connected to the counter means for triggering the SCR selected.

3. The control circuit of claim 1, wherein the first fault detection means further comprises:

a. a first over-voltage detection circuit for monitoring the voltage at the regulator output and inhibiting the clock generator when an over-voltage fault is detected;

b. a first over-current detection circuit for monitoring the switching regulator output current and inhibiting the clock generator when an over-current fault is detected.

4. The control circuit of claim 1, wherein the fault indication means further comprises:

a. switch means responsive to the second fault detection means, the switch means not being responsive to transient fault signals;

b. visual identification means responsive to the switch means for visually indicating the fault detected; and c. signal means responsive to the switch means for electrically indicating the fault detected, said signal means being connected to the master control panel.

5. The control circuit of claim 1, wherein the second fault detection means further comprises:

a. a second over-voltage detection circuit for monitoring the voltage at the load and providing an over-voltage signal when an over-voltage fault is detected;

b. an under-voltage detection circuit for monitoring the voltage at the load and providing an under-voltage signal when an under-voltage fault is detected; and c. a second over-current detection circuit for monitoring the switching regulator output current and providing an over-current signal when an over-current fault is detected.

6. The control circuit of claim 1, wherein the voltage regulation means further comprises:

a. comparison means connected to the switching regulator output for comparing the voltage at the output with a reference voltage and producing an error signal proportional to the difference between the two voltages; and b. clock pulse generator control means responsive to the error signal for controlling the clock pulse generator frequency and thereby controlling the switching regulator output voltage.

7. The control circuit of claim 6, wherein the clock pulse generator control means is electrically isolated from the error signal.

8. The control circuit for a switching regulator composed of a plurality of SCR-inductive reactor pairs, comprising:

a. timing means for triggering each SCR sequentially, the timing means further comprising:

a pulse generator;

gating means connected to the pulse generator for selectively inhibiting pulse generator signals;

discrimination means connected to the pulse generator for selecting the SCR to be triggered; and trigger means connected to the discrimination means and to the switching regulator for triggering the SCR selected;

b. fault detection means for detecting switching regulator faults, the fault detection means further comprising:

first over-voltage detection means connected to the switching regulator output for monitoring the switching regulator output voltage and providing an over-voltage fault signal when an over-voltage condition is detected;

second over-voltage detection means connected to the switching regulator output and gating means for inhibiting the pulse generator signals when an over-voltage fault is detected;

first under-voltage detection means connected to the switching regulator output and providing an under-voltage fault signal when an under-voltage condition is detected;

second under-voltage detection means connected to the switching regulator output for inhibiting the pulse generator signals when an under-voltage fault is detected;

over-current detection means connected to the switching regulator for monitoring the switching regulator output current and providing an over-current fault signal and inhibiting the pulse generator when an over-current is detected;

c. fault indication means connected to and electrically isolated from the first over-voltage detection means, the first under-voltage detection means and the over-current detection means for providing an indication for the type of fault detected, the fault indication means further comprising:

switch means responsive to nontransient fault signals;

visual indication means responsive to the switch means for transmitting information on the type of fault detected via the visual white spectra;

d. voltage regulation means connected to the switching regulator output and the pulse generator for maintaining the desired voltage at the switching regulator output, the voltage regulation means further comprising comparison means comparing the switching regulator output voltage with a reference voltage and providing an error signal proportional to the difference between the two voltages, the error signal being connected to the pulse generator for controlling the frequency of the pulses generated.

9. A control circuit as recited in claim 8 wherein the gating means further comprises:

a fixed pulse width signal generator responsive to the pulse generator output and an inhibitor thereof, for establishing the maximum frequency of the pulse generator; and a variable pulse width signal generator responsive to the fixed pulse width generator, whose pulse width is inversely proportional to the switching regulator output voltage for decreasing the pulse rate of the pulse generator and thereby the SCR triggering frequency during initial turn-on of the switching regulator.

10. A control circuit as recited in claim 8 wherein the trigger means further comprises:

decoding means for interpreting the discrimination means to sequentially select a SCR to be triggered, by sinking current from a current source enabled by a signal out of phase with the discrimination means, the current source further comprising:

a first reference voltage;

a rectifier in series with the first reference voltage and with its anode connected thereto;

a first resistor and a zener diode connected in parallel with the zener diode cathode connected to the cathode of the rectifier;

a first transistor, with its emitter connected to the cathode of the rectifier; a second resistor connected between the emitter and base; and a capacitor connected between the base and collector, and to the anode of the zener diode;

second and third transistors, with third and fourth resistors connected to the emitters of the second and third transistors respectively, connected in parallel with the base of each transistor connected to the anode of the zener diode and the connection of the two transistor collectors serving as the current source output;

a ferrite bead connected to cathode of the rectifier and the junction of the third and fourth resistors;

a fourth transistor with the emitter connected to the rectifier cathode through a fifth resistor, the base connected to a second reference voltage, and the collector connected to the base of a fifth transistor and to a third reference voltage through a resistor; and the fifth transistor with its collector connected to the anode of the zener diode and its collector connected through a sixth resistor to the enabling signal.

11. A control circuit as recited in claim 8 wherein the switch means further comprises:

a plurality of switching circuits composed of a SCR with its anode connected to the visual indication means and the signal means; a first capacitor connected between the cathode and gate of the SCR, the cathode also being connected to a reference voltage; a first and a second transistor connected between the gate and cathode; a silicon unidirectional switch (SUS) whose cathode is connected to the junction of the first and second resistors; a resistor-capacitor time delay circuit connected to the anode of the SUS, the appropriate fault signal and the reference voltage.

12. A control circuit as recited in claim 8 wherein the variable regulation means further comprising the reference voltage connected to a switchable resistive network for allowing a fixed increment or decrement in the reference voltage thereby providing for a fixed increase or decrease in the switching regulator output voltage.

13. A control circuit as recited in claim 9 wherein the variable pulse width signal generator further comprises a one shot whose resistive timing component is a first resistor connected between the switching regulator output voltage and the emitter of a transistor, the base of the transistor being connected to a second resistor and a reference voltage, the second resistor terminal which is not connected to the base being connected to the collector of the transistor.

* * * * *